US012575578B2

(12) United States Patent
Veber

(10) Patent No.: US 12,575,578 B2
(45) Date of Patent: Mar. 17, 2026

(54) AUTOMATED FOOD/FEED MASS TRANSPORT SYSTEM

(71) Applicant: GEA FOOD SOLUTIONS BAKEL B.V., Bakel (NL)

(72) Inventor: Jens Jakob Veber, Roskilde (DK)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 714 days.

(21) Appl. No.: 17/635,413

(22) PCT Filed: Sep. 2, 2020

(86) PCT No.: PCT/EP2020/074449
§ 371 (c)(1),
(2) Date: Feb. 15, 2022

(87) PCT Pub. No.: WO2021/043814
PCT Pub. Date: Mar. 11, 2021

(65) Prior Publication Data
US 2023/0063807 A1 Mar. 2, 2023

(30) Foreign Application Priority Data

Sep. 3, 2019 (EP) .................................... 19195103

(51) Int. Cl.
*A22C 17/00* (2006.01)
*A22C 5/00* (2006.01)

(52) U.S. Cl.
CPC ............ *A22C 17/0026* (2013.01); *A22C 5/00* (2013.01); *A22C 17/0093* (2013.01)

(58) Field of Classification Search
CPC ......... A22C 5/00; A22C 7/00; A22C 17/0026; A22C 17/0093; A22C 18/00
See application file for complete search history.

(56) References Cited

U.S. PATENT DOCUMENTS 3,050,399 A * 8/1962 Kielsmeier ............. A23L 13/65
426/646
3,777,909 A 12/1973 Rheinfrank, Jr.
(Continued)

FOREIGN PATENT DOCUMENTS

CN 101497009 A 8/2009
CN 209089937 U 7/2019
(Continued)

OTHER PUBLICATIONS

Chinese Office Action dated Oct. 11, 2023, for Chinese Application 202080061742.9.
(Continued)

*Primary Examiner* — Reginald Alexander
(74) *Attorney, Agent, or Firm* — The Dobrusin Law Firm, P.C.

(57) ABSTRACT
A food processing line that includes at least one grinder which grinds or pre-grinds food to form a food mass; at least two mixers which mix the ground or pre-ground food mass or at least two mixer-grinders which further mixes and grinds the ground or pre-ground food mass; and at least one portioning/moulding apparatus to portion and/or mould individual food/feed products. The at least one grinder, the at least two mixers, and the at least one portioning/moulding apparatus are connected by conveyors.

15 Claims, 9 Drawing Sheets

(56)                References Cited

U.S. PATENT DOCUMENTS

| | | | |
|---|---|---|---|
| 4,171,164 A | 10/1979 | Groves et al. | |
| 10,238,124 B2* | 3/2019 | Gardarsson | B01F 35/2117 |
| 2005/0255224 A1 | 11/2005 | Morin et al. | |
| 2009/0191318 A1 | 7/2009 | Cocchi et al. | |
| 2009/0214714 A1 | 8/2009 | Li | |
| 2016/0030943 A1* | 2/2016 | York | B02C 18/301 |
| | | | 241/30 |
| 2016/0214115 A1* | 7/2016 | Bauer | B02C 23/04 |
| 2016/0374357 A1* | 12/2016 | Lok | A22C 7/0069 |
| | | | 425/162 |
| 2018/0098562 A1 | 4/2018 | Terjung | |
| 2019/0082703 A1 | 3/2019 | Bearson et al. | |
| 2019/0116814 A1* | 4/2019 | Le Paih | A22C 7/0076 |

FOREIGN PATENT DOCUMENTS

| | | | |
|---|---|---|---|
| EP | 0094877 A2 | 11/1983 | |
| EP | 2158814 A1 | 3/2010 | |
| GB | 2280348 A | 2/1995 | |
| GB | 2412561 A | 10/2005 | |
| RU | 2007105 C1 | 2/1994 | |
| WO | 2008/101733 A1 | 8/2008 | |

OTHER PUBLICATIONS

International Search Report and Written Opinion mailed on Nov. 10, 2020, for International Application PCT/EP2020/074449.
International Preliminary Report on Patentability mailed on Dec. 14, 2021, for International Application PCT/EP2020/074449.
Chinese Third Office Action dated Feb. 28, 2025, for Chinese patent application No. 2020800617429.
Brazilian Search Report dated Mar. 18, 2025, for Brazilian Application 112022002547-5.
Brazilian Search Report dated Mar. 18, 2025, for Brazilian Application 122023017714-2.

* cited by examiner

AUTOMATED FOOD/FEED MASS TRANSPORT SYSTEM

CROSS-REFERENCE TO RELATED APPLICATIONS

This application is a U.S. National Phase application under 35 U.S.C. § 371 of International Application No. PCT/EP2020/074449, filed on Sep. 2, 2020 and which claims benefit to EP Application No. 19195103.7, filed on Sep. 3, 2019.

FIELD

The present invention relates to an automated food/feed mass transport line/system comprising at least one grinder, at least two mixers, and at least one portioning/moulding apparatus and which line/system is particularly applicable for a mass which will largely consist of high viscous protein food/feed such as poultry, chicken, pork, beef, meat replacement, vegetarian meat substitutes, fish, or pet food products. The present invention further relates to a method to operate the line.

BACKGROUND

Food product moulding lines according to the state in the art often have the problem that they are very labor-intensive and/or that a constant level of ice crystallization is not maintained.

SUMMARY

It is therefore the objective of the present invention is to reduce handling, reduce chance of mistakes as a result of the many trolleys, reduce loss of material, improve product quality, improve hygiene, and reduce energy consumption.

A further objective of the invention is to increase the capacity of the mass transport system to be able to provide a portioning/moulding apparatus at all times without waiting times with sufficient mass such that it can run continuously and supply a continuous stream of products to the equipment further downstream, therefor at least two mixers will be applied and at least one of the multiple mixers will act as a buffer resulting in an extended discharge time of mixed mass within the system.

Another objective of the invention is further to be able to maintain the level of ice crystallization and be able to control and maintain the temperature of the food mass in order to obtain a consistent (weight, temperature, and composition) mixed food mass and consequently consistent portioned/moulded food/feed product.

The objective is attained with a food processing line comprising at least one grinder which grinds or pre-grinds food to form a food mass, at least two mixers which mixes the ground or pre-ground food mass or at least two mixer-grinders, which further mixes and grinds the ground or pre-ground food mass and at least one portioning/moulding apparatus to portion and/or mould individual food/feed products, wherein the grinder(s), the mixers, and the portioning/moulding apparatus are connected by conveyors, respectively.

The disclosure made regarding this subject matter of the present invention also applies to the other subject matters and vice versa.

The present invention relates to a food processing line. In this line, a food mass is ground, mixed and then formed. The product can further be battered/coated, fried, cooked, chilled and/or packaged. The food mass to be processed can frozen and/or not-frozen. The food mass preferably comprises high viscous protein food/feed such as poultry, chicken, pork, beef, meat replacement, vegetarian meat substitutes, fish or pet food products.

The inventive line preferably comprises at least one grinder, in which one or more different types of food mass are ground. This ground mass is then transported, preferably automatically to at least two mixers, in which the ground mass is mixed, preferably mixed with additional substances, like a liquid, spices and/or solid substances. Alternatively, downstream from the at least one grinder, at least two mixer-grinder, which execute besides the above-mentioned mixing also a further grinding. Subsequently, at least one portioning/moulding apparatus is provided in the line to portion and/or mould individual food/feed products out of the food mass. The portioning/moulding apparatus preferably operates continuously or semi-continuously. The transportation between the components is executed by conveyors, preferably belt conveyors. No trolleys are utilized to transfer the food mass from one component to the next. This very efficient and hygienic.

The at least two mixers or mixer-grinder are preferably identical and more preferably can be operated individually.

Preferably, each mixer or mixer-grinder is provided as a buffer for the food mass to portioned of formed; i.e. food mass can be stored in buffer to assure that the portioning/moulding apparatus can operate continuously or semi-continuously. Preferably, the moving means of the mixer and/or mixer-grinder, which execute the mixing or mixing and grinding, are driven by a torque controlled motor. Preferably, the torque that the motor provides depends on the temperature of the food product in the mixer and/or mixer-grinder. Preferably, one mixer or mixer-grinder is filled and/or operates as a buffer, while the other mixer or mixer-grinder is emptied.

According to a preferred embodiment of the present invention, each mixer or mixer-grinder has means to adjust or maintain the temperature of the food mass. Preferably, a liquid, inert gas can be introduced into a chamber of the mixer or mixer-grinder. Alternatively, the mixing/grinding-means and/or the jacket of the mixer or mixer-grinder is cooled.

Preferably, the ice crystallization and/or the temperature of the food mass is controlled. Preferably, first the food mass is cooled down, until it reaches its refreezing point temperature. This cooling is preferably controlled by a temperature measuring device. Then the degree of ice crystallization is controlled, preferably by means of a torque motor driving the mixer paddles.

The control system comprises data about the torque needed to mix a specific mass in the mixer which has a certain desired degree of ice crystallization, preferably depending on the degree of filling of the mixer. In case the torque needed is too low, the degree of ice crystallization is to low and vice versa. Depending on the ice crystallization, the cooling of the food mass is controlled. The same applies also for a mixer-grinder.

The ability to control the ice crystallization will result in less ice crystallization. The ability to maintain the temperature during and especially after the mixing- or mixing/grinding-process is beneficial in the portioning/moulding process and is energy-efficient especially in a further processing line, because it is not needed anymore to cool down the mixed food mass more than necessary resulting in less cooking time within for instance the fryer and/or cooking oven.

Preferably, each mixer or mixer-grinder is provided with a controlled opening/closing means. This controlled opening/closing means preferably forms/shapes the food mass discharged from the mixer or mixer-grinder, preferably into a string or string-segments. Preferably, the size of the opening increases during discharge. The relation between rotation speed and rotation direction of mixer paddles with the openness of discharge openings will determines the shape the food mass which leaves the discharge opening, for instance as thin slabs.

During discharge of each mixer or mixer-grinder via the discharge opening the openness of discharge openings and/ or the rotation speed of mixing-means will increase as the mixer becomes emptier.

Preferably, a conveyor. preferably a belt conveyor, is provided to receive discharged mixed mass out of the mixers or mixer-grinder. The conveyor transports the mixed mass directly to a hopper of portioning/moulding apparatus. Preferably, the mixers or mixer-grinders discharge only the amount of food mass, that the hopper can take up, so that no food mass is stored on/in the conveyor. Preferably, the conveyor is operated intermittently, preferably essentially only when it is loaded with food mass.

Preferably, the speed of conveyor and the (belt) speed is controlled such that the conveyor will not be overfilled during discharge of mixed food mass out of the mixers or mixer-grinders.

According to a preferred embodiment of the present invention, the grinder and/or the mixer and/or the mixer-grinder is provided with weighing-means, to determine how much ground food mass and/or how much brine/water/ marinates and/or how much dry ingredients/skin emulsion/ other additives are loaded therein. Preferably, the weighing means is preferably a load-cell(s). Weighing means underneath mixer can be applied to determine the degree of filling of the mixer, mixer-grinder and/or grinder. The signal of the weighting means can be utilized to control the filling/ emptying of these components or the emptying of an upstream apparatus. The signal can also be used to initiate an action of an upstream-apparatus, for example discharge of food mass in case a mixer/mixer-grinder is too empty and/or reduction/stop of discharge of food mass in case the mixer/ mixer-grinder is almost full. The signal of the weighing means can also be utilized as input into a calculation program to calculate upfront the food mass needed to be discharged from the grinder.

Preferably, a hopper is provided upstream from the portioning/moulding apparatus. In this hopper a certain amount of food mass to be portioned and/or moulded can be stored. The hopper preferably comprises a measuring/detecting means to measure the degree of filling of the hopper.

The filling of the hopper is preferably not be a continuous process but a step filling process.

In case the measuring/detecting means determine that the hopper of portioning/moulding apparatus needs to be filled, the control system of the inventive line will do a request for new food mass from mixers 8 preferably from the mixer which acting at that specific moment as a buffer.

The food mass fed into the initial grinder is preferably provided in trolleys. A trolley scanner is preferably provided upstream from the grinder. This trolley scanner scans information from an electronic storing means, for example information regarding the amount of food mass, its composition and/or its origin. Later in the process, preferably no trolleys are utilized anymore.

The problems are also solved with a method to produce a portioned and/or moulded food products with the inventive food production line, wherein ground or pre-ground food-mass is buffered in the mixer.

The disclosure made regarding this subject matter of the present invention also applies to the other subject matters and vice versa.

Preferably, the temperature of the food mass in the mixer is controlled. Preferably, the torque of a motor, that mixes the food mass in the mixer is controlled.

Preferably, the line comprises conveyor means, wherein the conveyor means are emptied after each instance that they have transported food product. No food product is stored on/in the conveyor means. Each time the conveyor means have transported food mass, for example from the mixer or mixer-grinder to the hopper, the conveyor is totally emptied. Preferably, the conveyor means are stopped, after all food mass has been discharged.

Preferably, the line comprises a hopper upstream from the portioning/moulding apparatus and the hopper comprises a level sensor, wherein the signal of the level sensor is utilized to control the discharge of the food mass from the mixers or mixer-grinders. In case this sensor senses that the hopper approaches, the desired high level the discharge of mixed mass out of the mixers will be stopped and the conveyor is emptied into the hopper.

According to a preferred embodiment, the degree of filling of one mixer triggers the operation of the grinder.

Preferably, downstream from the portioning/moulding apparatus, a coating equipment, frying equipment, cooking equipment, freezing equipment and/or packaging equipment will do a request for new portioned/formed products. This will trigger a request for new mixed food-mass from the mixer or mixer-grinder.

Preferably, the line comprises a brine supply, to add brine to the ground food mas. Preferably, at least one buffer/buffer tank will be applied in order to collect brine and/or other ingredients. The buffer/buffer tank is in fluidized connection with mixers. The control system preferably requests to supply brine from the buffer/buffer tank to the mixer.

Other ingredients, particularly solid ingredients, can be supplied to the mixer. In case the control system requests filling of a mixer, the mixers or the control system will request for the supply of the additional ingredients, which can be supplied via bin/trolley/loading equipment. Confirmation to the control system that additional ingredients have been supplied to the mixer(s) can to be done manually or can be confirmed via the reading of weighing means.

The moulding of food products takes place in a moulding apparatus comprising a mould member comprising a side-wall and preferably a bottom wall defining the dimension of the moulded products. The mould member can be a mould plate, mould turret or mould drum. Preferably, the moulding apparatus is a drum type moulding apparatus comprising a rotating mould drum whose circumference is provided with rows of cavities which cavities comprising at least partially a porous structure and which cavities will be filled with mass at a filling location and after further rotation of the drum the moulded products will be discharged onto a conveyor at a discharge location.

In case conveyor between the mixer or mixer-grinder and the portioning/moulding apparatus is emptied, the control unit will control the conveyor preferably such that they will run with a predetermined speed during a predetermined period of time, which calculation is based on the distance between discharge openings of the mixers to the hopper of the portioning/moulding apparatus.

Preferably, reading means/scanning means are applied to scan bins/trolleys provided to the line, particularly bins/trolleys containing meat. The collected data can be stored and/or processed within an automatic batch control system provided on a computer, preferably a computer that controls the line.

The following disclosure specifically applies to a food mass comprising chicken:

The mixers can be provided with a torque control to obtain a consistent discharged mixed mass from different batches with regard to the level of ice crystallization and temperature.

At least two grinders can be provided to grind chicken breast meat and chicken leg meat preferably separately. The two meat streams can be connected on/in a conveyor which connects the two grinders with the at least two mixers.

The mixed mass which enters the portioner/former can comprise at least chicken breast meat and chicken leg meat which can be portioned/moulded with a portioning/moulding apparatus to a so called "nugget" shape and which portioned/moulded product will after portioning/moulding be coated preferably with a tempura coating and fried and/or cooked and afterwards frozen and/or packaged.

The following disclosure specifically applies to a food mass comprising beef:

According to one preferred embodiment, the line comprises at least two pre-grinders to pre-grind lean beef meat and the fatty beef meat, preferably separately. The pre-ground meat is provided, preferably jointly, to at least two mixers via a conveyor.

Here water, brine and/or further ingredients can be added. The mixed beef is then transported via a conveyor to at least one final-grinder which is connected via a conveyor to the portioning/moulding apparatus. Each final grinder is preferably provided with weighing means, preferably load cells.

According to another embodiment, the inventive line comprises at least two pre-grinders to pre-grind lean beef meat and fatty beef meat, preferably separately. The pre-ground meat as provided, preferably jointly, to the at least two mixer-grinders via a conveyor. The mixed beef is then transported via a conveyor to the portioning/moulding apparatus.

The portioning/moulding apparatus can be provided with a grinding head in order to produce hand-made looking products.

According to one embodiment, the mixed mass which exits the mixer preferably comprises lean beef meat and fatty beef meat, wherein the mixed mass is, preferably after final-grinding moulded with a moulding apparatus in a so called "burger" shape and which moulded product can be frozen directly after moulding and/or which will be packaged as a so called "case ready" product.

In a further embodiment of the invention the automated food/feed mass transport line/system comprising at least one grinder which grinds or pre-grinds food to form a food mass, at least two mixers which mixes the ground or pre-ground food mass or at least two mixer-grinders which further mixes and grinds the ground or pre-ground food mass wherein at least one of the mixers/mixer-grinders act as a buffer, at least one additional buffer means and at least one portioning/moulding apparatus to portion and/or mould individual food/feed products, wherein the grinder, mixers or mixer-grinders, buffer means and portioning/moulding apparatus are preferably connected by conveyors and/or wherein buffer means are located between the mixers/mixer-grinders and portioning/moulding apparatus. The additional buffer means are preferably located after the at least two mixer-grinders/mixers and before the at least one portioning moulding apparatus.

Buffer means is in the context of this application not limited to for instance a hopper or bin but can be a wide variety of devices or equipment such as a pump, a screw, a belt, a mixer. In case the capacity of buffer is larger than the capacity of the hopper of portioning/moulding apparatus, mixed mass can be supplied entirely from buffer. After a request of food mass, buffer can be loaded again with food mass from mixer 8/mixer-grinder. In case, after a request of food mass, the buffer cannot supply sufficient mass to portioning/moulding apparatus, mixer/mixer-grinder which acts at that specific moment as the buffer will supply mass to buffer and from thereon to portioning/moulding apparatus to compensate this.

In an alternative embodiment of the invention the automated food/feed mass transport line/system comprising at least one grinder which grinds or pre-grinds food to form a food mass, at least one mixer which mixes the ground or pre-ground food mass or at least one mixer-grinders which further mixes and grinds the ground or pre-ground food mass, at least one additional buffer means and at least one portioning/moulding apparatus to portion and/or mould individual food/feed products, wherein the grinder, mixer or mixer-grinder, buffer means and portioning/moulding apparatus are preferably connected by conveyors and wherein buffer means are located between the mixer 8/mixer-grinder and portioning/moulding apparatus.

BRIEF DESCRIPTION OF THE FIGURES

In the following, the inventions are explained according to the embodiments shown in the Figures. These explanations do not limit the scope of protection and apply to all embodiments of the present invention likewise.

DETAILED DESCRIPTION

Figure 1:
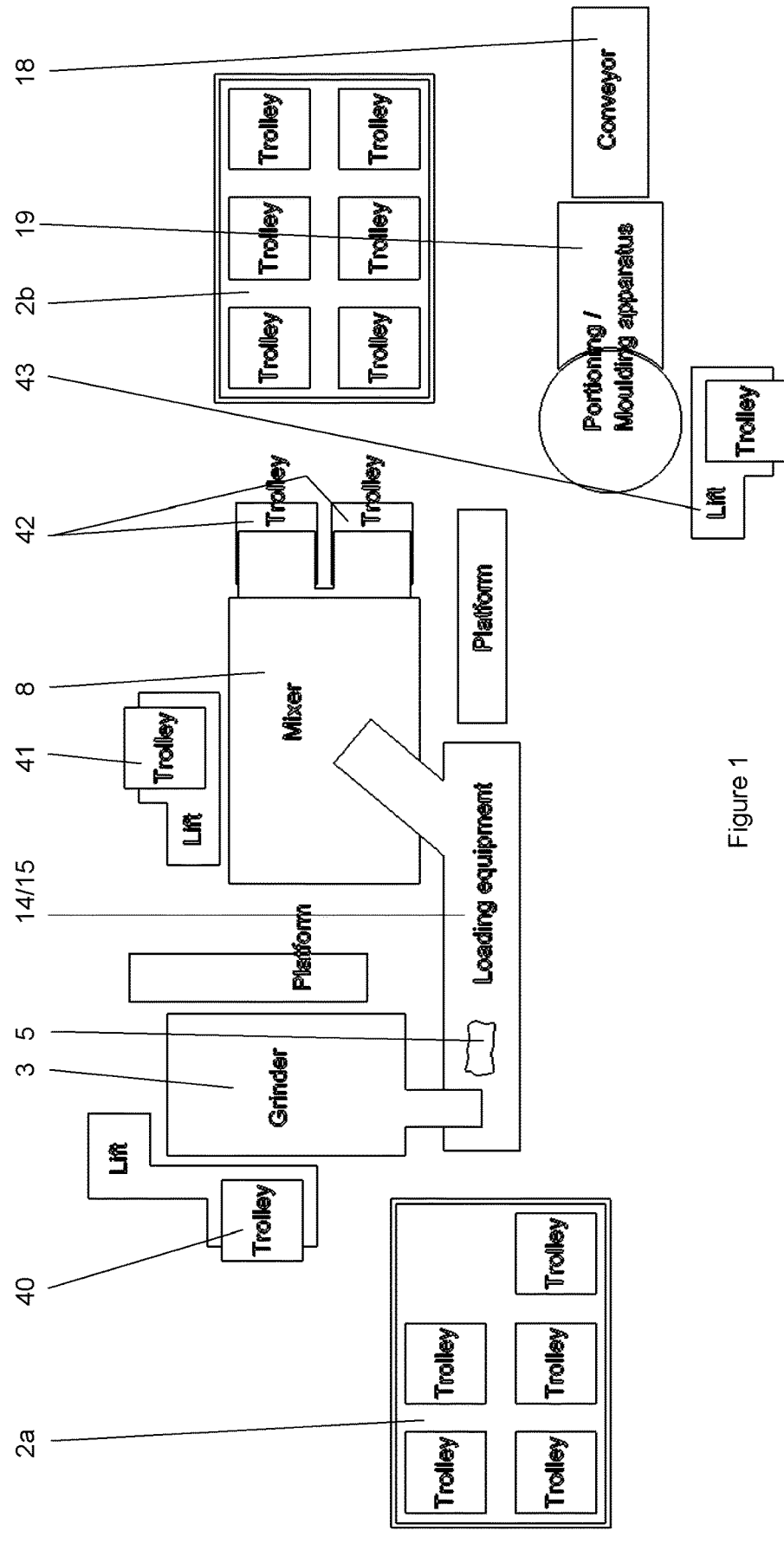
FIG. 1 shows a line according to the state in the art.

FIG. 1 depicts a line according to the state in the art for processing a food mass which will largely consist of high viscous protein food/feed. The mass is stored in bins/trolleys in a cold-storage 2a and these bins/trolleys are manually transported towards grinder 3. The grinder is filled with mass via loading equipment 40. Ground mass 5 is transported to mixer 8 via conveyor/loader 14/15, in the depicted embodiment a screw loader. In another embodiment. the mixer 8 is filled with for instance ground mass via loading equipment 41. To increase capacity multiple grinders and/or mixers can be applied.

In case of for instance chicken mass consisting of both breast meat and leg meat and applying only one grinder and one trolley comprising both breast meat and leg meat the bin/trolley are filled such that the mixture consists of the correct weight/percentage of breast meat and the correct weight/percentage of leg meat in order to end up with the desired ratio breast meat/leg meat before adding these bins/trolleys to the grinder.

In another embodiment, a bin/trolley is filled with breast meat and another bin/trolley is filled with leg meat. Before adding the meat to the grinder both bins/trolleys need to be pre-weight and consequently material needs to be added/removed from the respective bins/trolleys to match the desired ratio breast meat/leg meat.

In a further embodiment, trolleys comprising ground breast meat and trolleys comprising ground leg meat will be supplied to the mixer. Both bins/trolleys need to be pre-weight and consequently material needs to be added/removed from the respective bins/trolleys to match the desired ratio breast meat/leg meat.

After mixing, the mass is stored in bins/trolleys 42 and depending on the time period till the mixed mass will be processed in portioning/moulding apparatus 19, the bins/trolleys will/must for hygienic reasons be stored within a cold-storage 2*b* to cool down the mass, preferably to a lower temperature than required to assure that all mass is cooled down sufficiently and will not get too warm in case it is taken out of the cold-storage 2*b* and has to wait some time out of the cold-storage before being further processed.

Bins/trolleys with mixed mass which are further processed are manually transported from the mixer 8 and/or the cold-storage 2*b* towards the portioning/moulding apparatus 19 and are supplied to the hopper of the portioning/moulding apparatus 19 via loading equipment 43. The moulded products are transported further downstream via conveyor 18.

Bins/trolleys require much handling activities (moving trolleys, trolleys to bring, empty and remove at the location of the loading equipment, weighing trolleys, manually adding/removing material to/from the bins/trolleys to achieve the correct weight, filling and emptying trolleys with additional ingredients etc.) and trolleys need to be cleaned. Further, there is a hygienic risk due to environmental pollution and/or the pollution with foreign particles. The use of bins/trolleys is risky, because they can be swapped/interchanged by an operator. A lot of manual handling concerning the trolleys and time to operate the loading equipment is needed.

Figure 2:
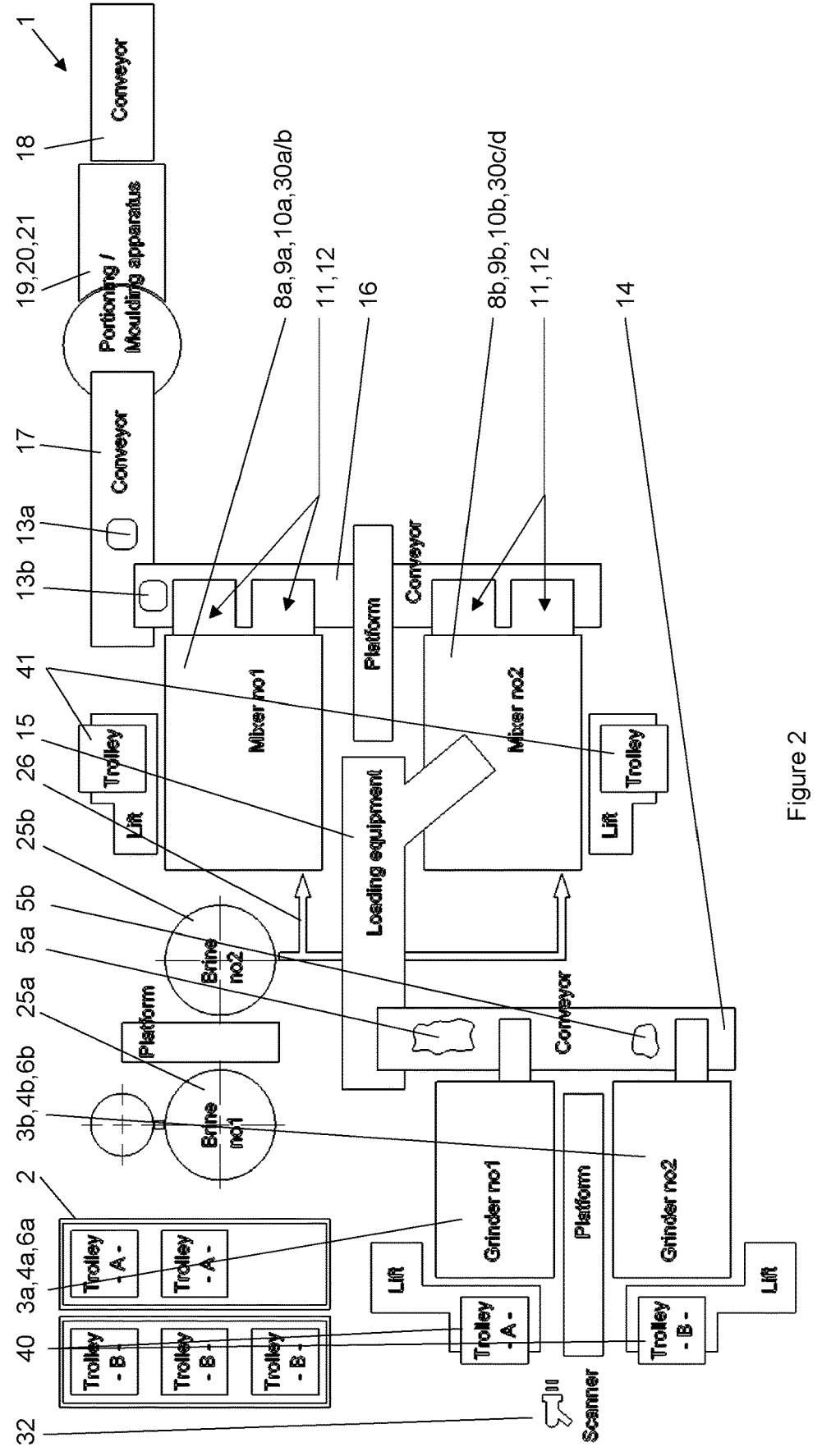
FIGS. 2 and 3 show an embodiment of the inventive line.

FIG. 2 depicts an embodiment of the inventive food production line 1 which is particularly applicable to produce chicken nuggets. After the food product has been introduced into the line, at the grinders 3*a*, 3*b* and/or the mixers 8*a*, 8*b*, no bins/trolleys are utilized anymore, which reduces the hygienic risk and the risk of mistakes being made by an operator.

Data-Reader Scanner

Reading means/scanning means 32 are preferably applied to scan bins/trolleys comprising a mass which will largely consist of high viscous protein food/feed. Reading/scanning can take place before the mass will be ground and the collected data can be stored for instance for reporting reasons and/or warranty-reasons in a computer-system, which can be part of the line 1. The line can also be connected to an intranet and/or the internet and the data can be stored on a computer which is part of this network. The data read is for example: time and/or date and/or location of the bin/trolley during data reading and/or the type of food product and/or the processing and/or slaughtering-history of the food product and/or the origin of the food product, for example animal labeling and/or historical data of the temperature in the bin/trolley and/or the weight of the food mass in the bin/trolley. The bins/trolleys are read-out/scanned before they enter the cold-storage and/or before their content is introduced into the line 1. The data read can be utilized to control the line 1 and/or for labeling the final product and/or as documentation of the production process, for example in case of a claim.

Grinder

Mass can be supplied in bins/trolleys and can be stored in (cold) storage 2 and when needed these bins/trolleys are manually and/or automatically transported towards grinders 3*a* and 3*b*. The grinders can be filled with mass via the loading equipment 40.

The number of grinders 3 to apply in preparing a food/feed mass can mainly depend on the desired final mix and the desired flexibility and can vary between one and multiple, preferably two or three per line. Each grinder is preferably operated batchwise. Preferably, each grinder is stopped, before the entire batch is ground and/or discharged. The meat can be fresh or frozen or a mixture thereof In case of the production of chicken nuggets comprising of a mix of breast meat and leg meat, preferably a first grinder 3*a* is loaded with trolleys "A" comprising breast meat (white meat) and after grinding the breast meat is discharged onto conveyor 14, preferably a belt conveyor. A second grinder 3*b* is loaded with trolleys "B" comprising leg meat (dark meat) and after grinding the leg meat is discharged also onto conveyor 14. What is left over in the grinder can be maintained there for the next batch. Preferably the grinder will not be emptied entirely, for example to prevent wear and tear of knifes and counter plates/hole plate. The desired recipe of the mass to be further process (fresh meat, frozen meat, ratio breast meat/leg meat) will determine how much ground mass should be discharged from the first grinder 3*a* and how much ground mass should be discharged from the second grinder 3*b*.

The selected type of grinders preferably depends on the mass to be processed and the desired final mix. In case of frozen meat, preferably a grinder such as the GEA Power-Grind can be applied to grind the meat. In case only fresh meat will be processed with a temperature of for instance −3° C. the applied grinder is preferably a GEA ComboGrind.

The volume of food mass processed in the grinder is not limited to the filling volume, "mixer-batch", of one mixer 8*a*, 8*b*. The volume is preferably sufficient for multiple mixer batches which are prepared independently from each other, but preferably at least essentially identical. Ground mass 5 from the grinder(s) can be pumped automatically into the mixer(s) 8. However, in case of high-quality food/feed mass, especially meat, preferably belt conveyors are applied. In case of multiple grinders, the discharge 5 of the grinders, in this embodiment the discharge of grinders 3*a* and 3*b*, is combined before it enters the mixer. Preferably, the grinders 3 discharge onto one and the same conveyor 14 or into one and the same pipe. The ground mass will be transported via conveyor 14 and in this embodiment a conveyor/loader 15, preferably a screw loader which is able to discharge ground mass, into mixer 8*a* or mixer 8*b* depending on which mixer 8 needs to be filled. In another embodiment of the invention conveyors 14 and 15 are integrated such that only one conveyor 14/15 connects the discharge openings of the grinder(s) with the mixer(s).

The number of grinders 3 within inventive line is not limited to one. Two grinders as depicted in the embodiment of FIG. 2 or multiple grinders, e.g. two, three or four, will also be applicable.

Mixers

To be able to provide portioning/moulding apparatus 19 with sufficient mixed mass, so that it can run preferably continuously or semi-continuously, at least two mixers 8 are applied wherein the at least two mixers can overlap each other regarding mixing process and discharge of the mixer.

According to the desired recipe mixers 8 to be filled can be provided with ingredients for instance received from ingredient mixer/mixing tank 25*a* such as a GEA ScanBrine. Brine and/or water and/or marinates can be mixed and the final mix can be pumped preferably automatically into mixers 8*a* and/or 8*b*. However, to secure the supply of ingredients to the mixer one or multiple ingredient buffer/buffer tanks 25*b* are preferably applied which will act as a buffer for mixed ingredients. In case mixing of brine in mixer/mixing tank 25*a* is finished the mixed brine will be pumped towards buffer/buffer tank 25*b*.

The mixing process within the mixer(s) 8*a* and/or 8*b* depends on the mass to be mixed and can comprise a sequence of process steps to be taken such as vacuumizing, mixing under vacuum, release vacuum, cooling. The mass within the mixers can be mixed by paddles 9 and can preferably be cooled for example by carbon dioxide or liquid nitrogen.

Each mixer preferably comprises means to determine the temperature of the food mass. This data is preferably supplied to the control system of the line and preferably stored.

Drive "9-drive" of mixer-means, preferably mixer-paddles 9 is preferably provided with torque control. In case of mixing of a certain food/feed mass such as, for example, chicken this control assures that there will be less variation between the final mixed food mass 13 of different and separately mixed batches. The final mixed mass 13 from different mixed batches will be more consistent and comparable to each other for instance with regard to the level of ice crystallization. This stable mixing process, particularly the same degree of ice-crystallization, will result in an increased line capacity. Furthermore, since the degree of degree of crystallization is well controlled, it can be reduced, which results in less energy consumption during the mixing and in subsequent heating-steps in the line, for example cooking and/or frying of the food mass. The data provided by the torque motor is preferably supplied to the control system of the line and preferably stored.

According to a preferred embodiment, one mixer 8 serves at least temporarily as a buffer, while the other mixer discharges food product to the downstream portioning/moulding apparatus 19. It is beneficial applying at least one mixer 8 as buffer instead of a conveyor, for instance in order to maintain the level of ice crystallization and/or be able to maintain the temperature of the mass during waiting times.

Due to the ability to control ice crystallization and temperature of mixed mass 13 within the mixer 8 the moulded products will be consistent in terms of less difference in variation of weight, temperature and composition. The ability to control the ice crystallization will result in less ice crystallization and consequently in less cooking time within for instance the fryer and/or cooking oven and therefor in an increased energy efficiency.

The food mass is preferably mixed at least temporarily during buffering.

The mixers 8 are preferably of a larger type as the mixers used according to the state in the art as described according to FIG. 1.

Preferably, the mixer is emptied batchwise and more preferably such that the residence time of the food mass 13 on/in the conveyor 16/17 is minimized. In case the portioning/moulding apparatus 19 comprises a hopper the mixer 8 preferably only discharges the amount of food mass that the hopper can take-up. So that at least essentially no food mass 13 stays on/in the conveyor means 16/17.

To facilitate that only a part of the volume of mass within the mixer will be transported towards the portioning/moulding apparatus 19 the discharge opening 11 of each mixers 8*a* and/or 8*b* is preferably opened and closed in an automatically controlled way between a fully closed position and an entirely open position by open/closing means 12. This preferred embodiment allows to control the volume/weight of discharged mass 13. The means can for instance be a flap driven by an automatically controlled motorized actuator such as a pneumatic actuator. In another embodiment, this means can be a hinged closing plate which can be opened over a predetermined angle and in a further embodiment it can be a valve which makes an essentially vertical movement in order to open/close the discharge openings. All embodiments are preferably driven by an automatically controlled motorized actuator.

The discharge 13 from the discharge openings 11 of both mixers 8*a* and 8*b* is preferably combined by preferably one and the same conveyor 16 preferably a belt conveyor. This conveyor 16 is downstream preferably connected to a preferably existing hopper of portioning/moulding apparatus 19 and transports mixed mass from the respective mixer 8 to the portioning/moulding apparatus 19. Mixed mass 13 of mixers 8 is discharged from the discharge openings onto conveyor 16 and is transported via conveyor 16 and preferably conveyor 17, more preferably a belt conveyor, towards the hopper of the portioning/moulding apparatus 19. In another preferred embodiment of the invention conveyors 16 and 17 are integrated such that only one conveyor 16/17 connects the discharge openings 11 of the mixers with the preferred hopper of the portioning/moulding apparatus 19 and conveyor 16/17 will transport mixed mass 13 directly within the hopper of portioning/moulding apparatus 19.

The number of mixers 8 within the line according to the invention is at least two.

Since only as much food mass 5, 13 is discharge from one component 3, 8 as the downstream component 8, 19 can take up, the food mass 5, 13 will be subject as short as possible to the ambient surrounding during transport towards the downstream component. The invention is in particular applicable for large production lines with high throughput wherein mainly one type of product will be produced during the day.

Portioning/Moulding Apparatus

The inventive line assures that the portioning/moulding apparatus 19 is supplied at all times with sufficient mass such that it can run continuously or semi-continuously and a continuous stream of portioned/moulded products to the equipment further downstream from the portioning/moulding apparatus 19 such as conveyor 18, coating equipment, frying equipment, cooking equipment, freezing equipment and/or packaging equipment. Due to the ability to control ice crystallization and temperature of mixed mass 13 within the mixer 8 the moulded products will be consistent in terms of less difference in variation of weight, temperature and composition. The ability to control the ice crystallization will result in an optimum ice crystallization and consequently in less cooking time within for instance the fryer and/or cooking oven and therefor in an increased energy efficiency.

The portioning/moulding apparatus 19 can for instance be a reciprocating mould plate type of moulding apparatus, a mould turret or can be a mould drum type of moulding apparatus. The portioning/moulding apparatus 19 preferably comprises a hopper and/or a pump system. The hopper and or the pump can be integrated into portioning/moulding apparatus 19 or can be a separate device which is connected via piping to the portioning/moulding apparatus 19. In a preferred embodiment, the drum type moulding apparatus comprises a rotating mould drum whose circumference is provided with rows of cavities which comprise at least partially a porous structure and which are filled with food mass at a filling location and after further rotation of the drum the moulded products will be discharged at a discharge location and further transported via conveyor 18.

The number of portioning/moulding apparatus 19 within the line 1 is at least one.

Product

The invention is preferably applicable for portioned and/ or moulded food/feed products, particularly produced from a mass which largely consist of high viscous protein food/ feed. In an embodiment, the mixed mass 13 comprises of at least chicken breast meat and chicken leg meat. The mixed is moulded with a portioning/moulding apparatus 19 in a so called "nugget" shape and the moulded product can, after moulding, be coated preferably with a tempura coating and fried and/or cooked and afterwards frozen and packaged.

Figure 3:
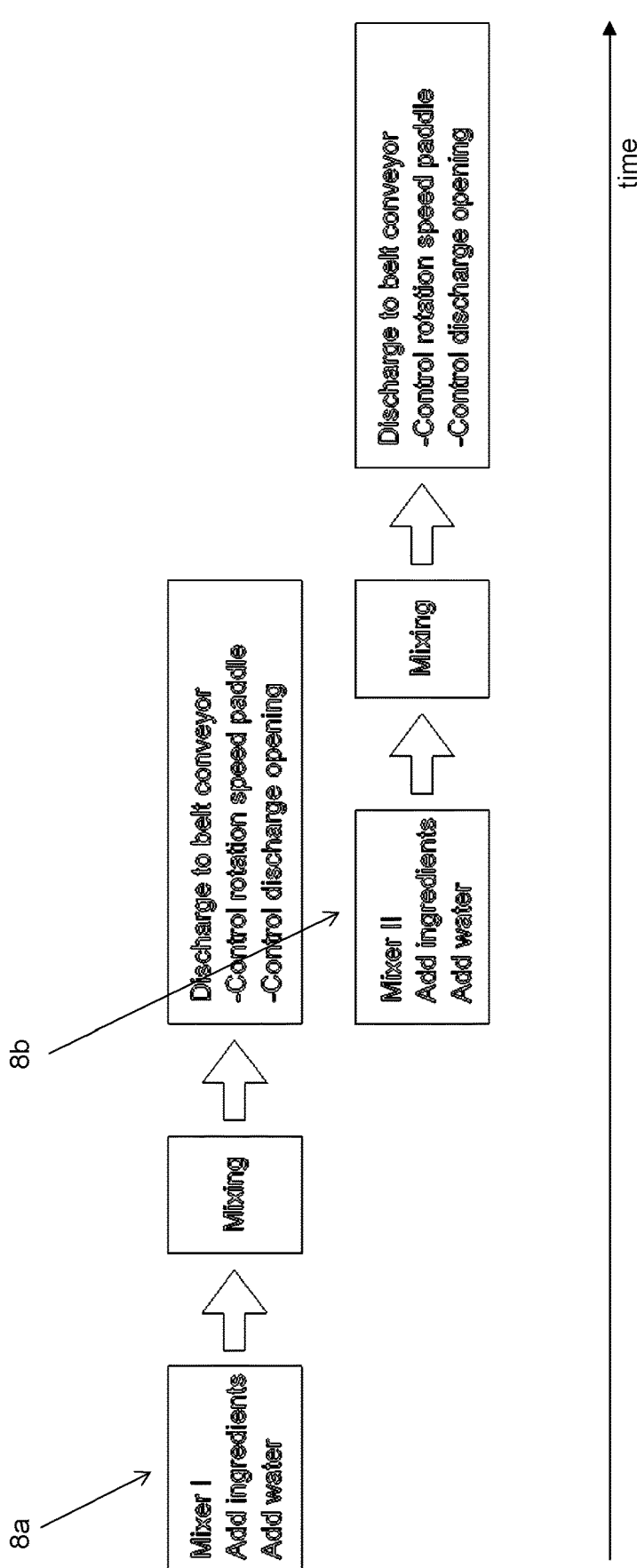

FIG. 3 depicts a preferred embodiment of inventive line 1. Reference is made to the disclosure made regarding FIG. 2. The line 1 comprises two mixers 8*a* and 8*b* wherein in case the mixing process in mixer 8*a* is already finished mixer 8*a* acts as a buffer for mixed mass while at the same time second mixer 8*b* is loaded with ground mass and preferably additional ingredients to match the desired recipe and thereafter the mixing process in this mixer 8*b* is started. After the first mixer 8*a* has been emptied, the second mixer 8*b* will from thereon act as the buffer. Therefor the mixing process in mixer 8*b* should be finished at the same time or somewhat earlier as the discharge process from mixer 8*a* is finalized, i.e. mixer 8*a* is empty or nearly empty. Subsequently, mixer 8*a* will be filled with ground mass and additional ingredients followed by the mixing process. Preferably, the mixing process in mixer 8*a* is finalized before mixer 8*b* is empty.

The emptying of the mixer is preferably executed batch-wise and more preferably on demand of the downstream portioning/moulding apparatus. While the respective mixer is stepwise emptied, the temperature and/or the degree of ice crystallization of the food mass in the mixer is controlled and/or the food mass is mixed. The mixer is preferably cooled. Preferably, the food mass is mixed, while the mixer acts as the buffer, preferably at least temporarily, more preferably at least during discharge of the food product.

A control unit 30 preferably controls the filling/mixing process and/or the discharge of food mass from one of the mixers 8 such that mixed mass is supplied to the portioning/ moulding apparatus 19 at all times and consequently the capacity of the line will increase.

In another embodiment of the invention comprising two mixers 8*a* and 8*b* the mixing process in mixer 8*b* is finished later than the discharge process of mixer 8*a* is finalized, i.e. mixer 8*a* is emptied. This embodiment is only preferable as long as portioning/moulding apparatus 19 can run continuously during this period of time with sufficient available mixed mass within the hopper.

In an embodiment of more than two, mixers preferably at least one mixer will act as a buffer such that mixed mass can be supplied to portioning/moulding apparatus 19 at all times.

Preferably, the food mass 13 is discharged from the respective mixer 8 intermittently and during one cycle only to an extent that the entire discharged food mass 13 can be taken up by the hopper of the portioning/moulding apparatus 19. This assures that the food mass 13 is only exposed to the ambient for a very short period of time. And hence does not warm up and/or gets contaminated by foreign substances.

Figure 4:
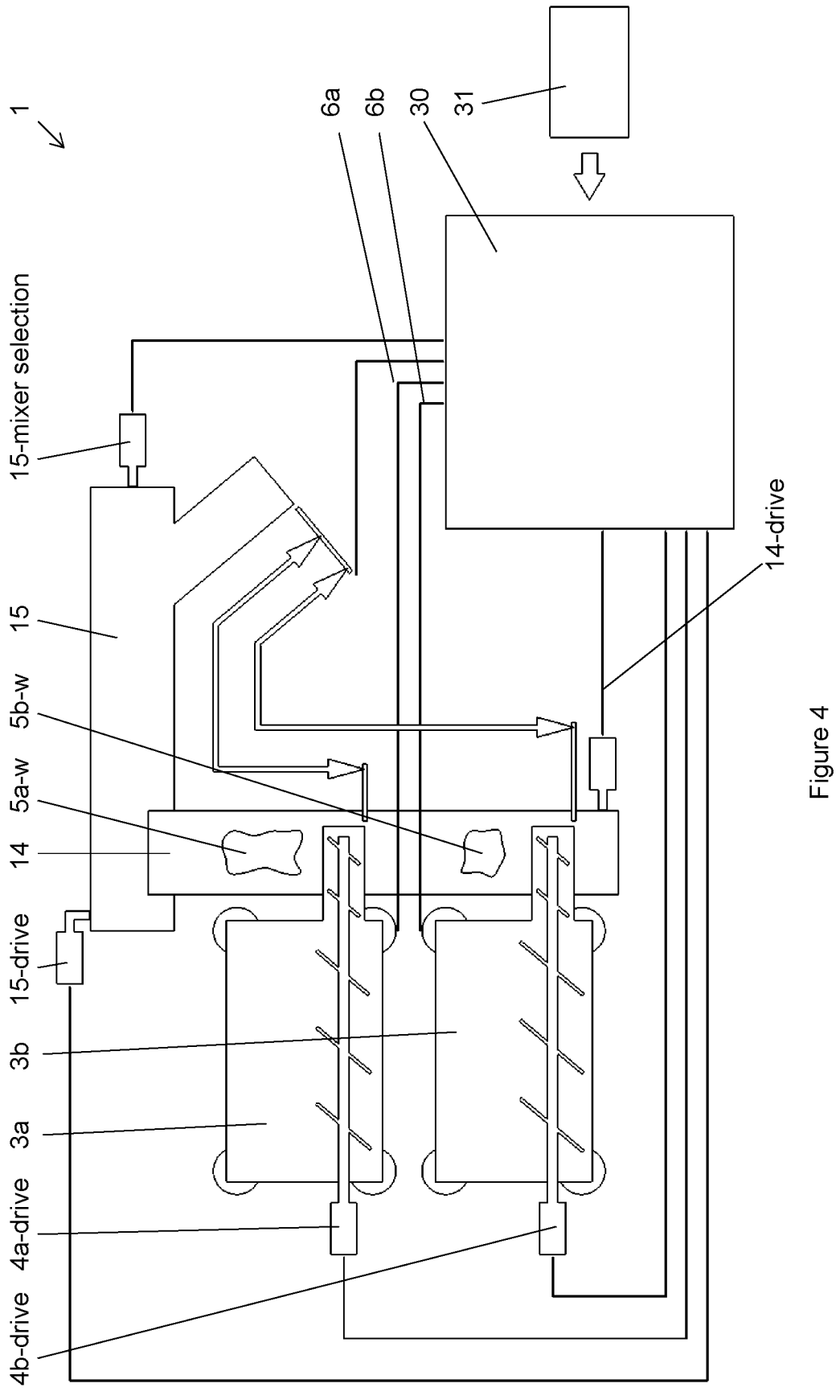
FIGS. 4 and 5 each depict an embodiment of a control unit of the line.
Figure 5:
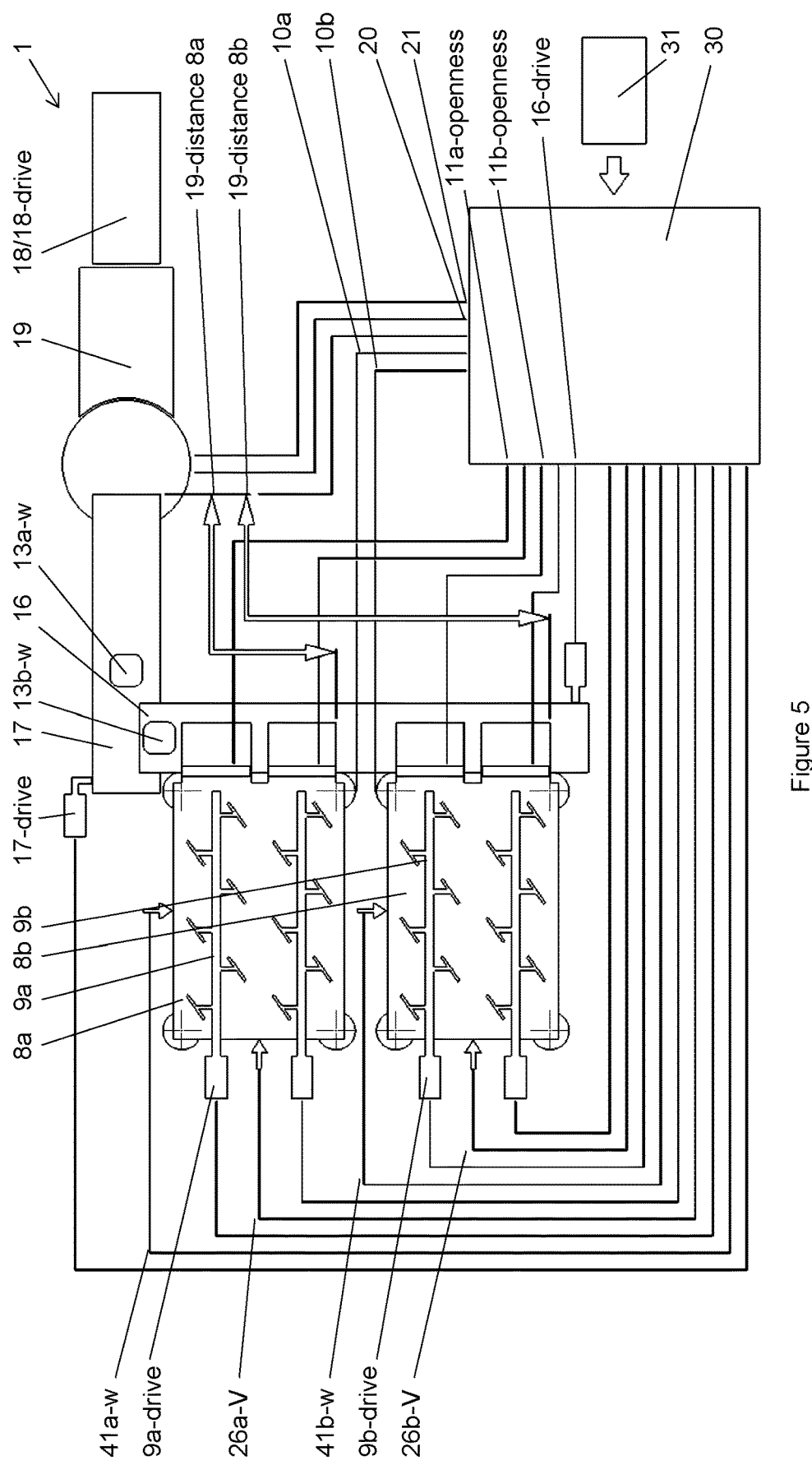

FIG. 4 and FIG. 5 depict each an embodiment of the control unit 30 and related parameters to run the line 1. The control unit 30 can be part of the portioning/moulding apparatus 19 but preferably the control unit 30 is located at a remote location wherein the control of all components of the line 1 is. Preferably, line 1 is centrally controlled. The control unit 30 can be connected to an inter- and/or intranet. The control unit 30 can be part of the cloud.

Process Control—Loading Weight Grinder

Similar as in the Prior-Art bins/trolleys 40 can be pre-weight before loading into the grinder(s). More preferably the weight will be determined by applying weighing means such as load cells 6*a*/6*b*/ and so on underneath the respective grinders 3*a*/3*b*/ and so on. The weighing means 6*a*/*b* can also determine if the grinder is loaded sufficiently and/or loaded to maximum capacity.

Process Control—Discharged Weight Grinder

The discharge 5 from the grinders towards conveyor 14/15 and subsequently to the mixers 8 preferably takes place with a predetermined speed "4-drive" of grinder screws 4 after a request for ground food mass 5 and until the target weight of discharged ground mass "5-*w*" [kg] has been reached. The grinder(s) may need to be filled again in order to be prepared for the next request for food mass 5.

To overcome the handling as in the Prior-Art and to measure the discharged weight output "5-*w*" from grinders 3 conveyors 14 and/or 15 can be provided with weighing means for instance can be designed as a weighing belt. In case of multiple grinders 3 every discharge opening of a grinder discharges on/in a conveyor 14 preferably designed as a weighing belt 14*a*/14*b*/and so on and/or 15. Preferably, the weighing means are designed such, that the weight of food mass 5 discharged from grinder 3*a* can be measured separately from the weight of the food mass 5 discharged from grinder 3*b*.

More preferably each and every grinder 3 can be provided with weighing means 6 for example a load cell(s) such that the discharged weight "5*a*-*w*" of food mass 5, for instance ground breast meat, out of mixer 3*a* and the discharged weight "5*b*-*w*" of food mass 5, for instance ground leg meat, out of mixer 3*b* and/or the total discharged weight "5-*w*" of ground mass out of grinder(s) 3*a*, 3*b* can be determined. The applied weighing means 6 can also determine the degree of filling, for example if the grinder is empty or nearly empty.

To be able to control the weight of food mass loaded into the grinder and/or discharged out of the grinder filling and discharging preferably does not be take place at the same time.

Conveyors 14/15 preferably run with a predetermined speed "14-drive" and "15-drive". The mixer wherein the ground mass is discharged, can be selected by "15-mixer selection". Preferably, the conveyor 14 and/or 15 do not run continuously but intermittently.

Process Control—Loading Weight Mixer

The mixer 8 to be filled, preferably requests according a recipe, ingredients autonomously with or without acknowledgment of an operator. Dosing of, for example, mixed brine from buffer/buffer tank 25*b* can be done after a request from one of the mixers. In a preferred embodiment all ingredients will be transported automatically via supply line(s) 26 to each mixer 8 which are therefore preferably provided with flow meters. Water (a water (flow) meter can be provided with the mixers) can be added separately to each mixer.

To be able to add ingredients to the mixer which are not pumpable and/or will preferably not be pumped such as chicken skin emulsion or dry ingredients and/or to create additional flexibility to the system bin/trolley/loading equipment 41 may be provided. Depending on the recipe, a request for additional supply "41-*w*" [kg] which can be supplied via bin/trolley/loading equipment 41 will be done. To prevent that too little or too much material will be supplied the bins/trolleys are preferably pre-weight. Confirmation that material is supplied to the mixer(s) can be done manually.

To be able to determine how much ground food mass is loaded "5*a*-*w*"/"5*b*-*w*" and/or how much brine/water/marinates "26-V" [liter] is loaded out of buffer/buffer tank 25*b* and/or how much dry ingredients/skin emulsion/other additives are loaded "41-*w*" [kg] the weight of each and every component is preferably determined separately, more preferably before loading into mixer 8. More preferred weighing means 10 underneath mixers 8 will be applied. From importance for individual measurements may be that the individual mass/ingredients are all be loaded separately with time periods in between. The applied weighing means 10 can also determine if the mixer is loaded sufficiently and/or loaded until maximum capacity.

Process Control—Discharged Weight Mixer

To be able to measure the discharged weight output 13 from mixers 8 conveyors 16 and/or 17 can be provided with weighing means for instance designed as a weighing belt. In case of multiple mixers 8, every discharge opening of a mixer 8 discharges to a conveyor 16, preferably designed as a weighing belt 16*a*/16*b*/and so on and/or 17. More preferably each and every mixer 8 can be provided with weighing means such as load cells 10*a*/10*b*/and so on such that the discharged weight "13*a/b*-w" of mixed mass out of mixer 8 can be determined. The applied weighing means 10 will also determine the degree of filling of the mixer. This signal can be used to determine when the discharge has to be switched from one mixer to the other.

Process Control—Portioning/Moulding Apparatus

Portioning/moulding apparatus 19, particularly its hopper, is preferably provided with measuring/detecting means such as pressure sensing means but more preferably filling-level sensing means; one measuring/detecting means 20 senses if the hopper needs to be refilled and a second measuring/detecting means 21 sense if the hopper is filled until the desired high level. In another embodiment one single measuring/detecting means 20 is able to detect the refill level as well as high level. Preferably the filling of the hopper of portioning/moulding apparatus 19 will not be a continuous process but will be a step filling process wherein filling will take place every now and then. Portioned/moulded products can be transported further downstream via conveyor 18 and with a predetermined belt speed "18-drive"

Process Control—Loading Conveyors 16/17 and Emptying Conveyors 16/17

In case measuring/detecting means 20 sense that the hopper needs to be refilled portioning/moulding apparatus 19 will do a request for mixed food mass 13 from the mixers 8 and the food mass 13 will be supplied by the mixer which acting at that specific moment as a buffer. This mixer discharges only upon this request and only the amount of food mass requested by the Portioning/moulding apparatus 19.

The relation between rotation speed and rotation direction "9-drive" of the mixer paddles 9 preferably depends on the loading of the mixer which can be measured by level sensing means but preferably by weighing means 10 such as load cells and is preferably automatically controlled by the control unit 30. In case the mixer is fully loaded and the mixing process is ongoing paddles 9 must prevent that by their rotation air will be enclosed within the mass and that the mass will be overworked. The automatic control system preferably comprises a sensor to determine the amount of gas in the food mass and/or the degree of mixing of the food mass. The signal from this sensor is utilized to control the speed of rotation, rotation time and/or rotation direction of the paddle.

In case of discharging mixed food mass 13 out of the mixer the viscosity/thickness, composition/stiffness and flow behavior of the mass can be important; compared to a higher viscosity mass, a lower viscosity mass can easily be discharged and the volume of discharged mass is more difficult to control.

Further in case of discharging mixed mass in a certain period of time the relation between rotation speed and rotation direction "9-drive" of mixer paddles 9 in combination with openness "11-openness" [%] of discharge openings 11 determines in which shape the mass will leave discharge openings 11, for instance as thin slabs.

The relation between rotation speed and rotation direction "9-drive" of mixer paddles 9 in combination with the openness of discharge openings 11 depends further on how much mass will be discharged in a predetermined period of time. At least one of those parameters is preferably controlled during discharge of food mass 13. In a preferred embodiment of the invention, the rotation speed and/or rotation direction of mixer paddles 9 and/or the openness of discharge openings 11 is controlled depending upon the filling degree of the mixer 8.

Control unit 30 can be provided with parameters such as rotation speed of the mixer paddles 9, rotation direction and/or openness discharge openings 11 and how much mixer 8 is filled preferably determined by weighing means. Rotation speed and/or the degree of openness of the discharge openings can be set values related to a certain weight of the food mass in the mixer 8. In another embodiment the openness of the discharge openings 11 can be a set value related to preferably the weight of mixer 8 while the rotational speed will be determined depending on the time period wherein the weight changes.

In case of a constant discharge of mass and in case mixer 8 is fully loaded discharge openings 11 can be opened, for instance "11-openness" being 25% and the rotation speed "9-drive" of paddles 9 being relatively low. In case the mixer is almost empty discharge openings 11 will be opened further, for instance "11-openness" being 100% and the rotation speed "9-drive" of paddles 9 now being relatively high.

Preferably the (belt) speed of conveyor 16 below the discharge openings and the (belt) speed of an optional connected conveyor 17 are controlled such that the conveyors are not overfilled during discharge of mixed mass. The (belt) speed "17-drive" of conveyor 17 can be preferably higher than the (belt) speed "16-drive" of conveyor 16.

In case the mixer which acts as a buffer is empty before the predetermined volume of mass to be discharged is reached and the second mixer has finished the mixing process this second mixer can discharge food mass 13 until the desired total mass is reached and preferably simultaneously the emptied mixer is reloaded with mass and ingredients and will thereafter be started to prepare the mix.

Due to hygienic reasons it is preferably to cover and cool the mixed discharged mass 13 on conveyor 16/17 to assure that the food/feed mass will maintain the desired temperature and to prevent contamination by subjecting the mass to the ambient surrounding.

More preferable conveyor(s) 16/17 will be emptied after loading the hopper of portioning/moulding apparatus 19 such that mixed mass 13 will not remain on the conveyor(s) 16/17. The control unit 30 can therefore be provided with fixed parameters related to the layout of the system such as the distance "19-distance 8*a*" [m] and "19-distance 8*b*" [m] of the discharge openings of mixers 8*a* respectively 8*b* to the hopper of portioning/moulding apparatus 19. In case that the portioning/apparatus is provided with sensing means 21, after a high level is sensed and/or determined by the control unit conveyors 16/17 will be running with a predetermined speed "16-drive" and "17-drive" during a predetermined period of time "16/17-empty" [s] which calculation is based on the distance "19-distance 8*a*" and/or "19-distance 8*b*" between discharge openings mixers 8 to the hopper of portioning/moulding apparatus 19.

All mass 13 present on the conveyors will preferably be supplied to the hopper. The time period "16/17-empty" [s] can be a flexible parameter which can be inputted in control unit 30 via parameter input source 31 for instance an operating panel. Preferably the conveyors are emptied within 40-50 seconds and more preferably within 10-15 seconds. According to another embodiment, the line comprises a sensor which determines the presence of food mass on/in the conveyor. During one discharge, the conveyor(s) 16/17 are preferably operated until this sensor does not sense the presence of food product anymore.

The inclination of conveyor 17 towards portioning/moulding apparatus 19 is preferably adjustable, more preferably depending on the product application.

In a first embodiment of filling the hopper of portioning/moulding apparatus 19 with mixed mass control unit 30 will start discharge from buffer mixer 8 and will stop the discharge when measuring/detecting means 21 will sense that the hopper is filled sufficiently. To prevent that the hopper will be overfilled during emptying of the conveyor(s) 16/17, the "sufficient" level 21 is lower than the maximum filling level of the hopper.

Automated Transport Towards the Grinder(s)

Figure 6:
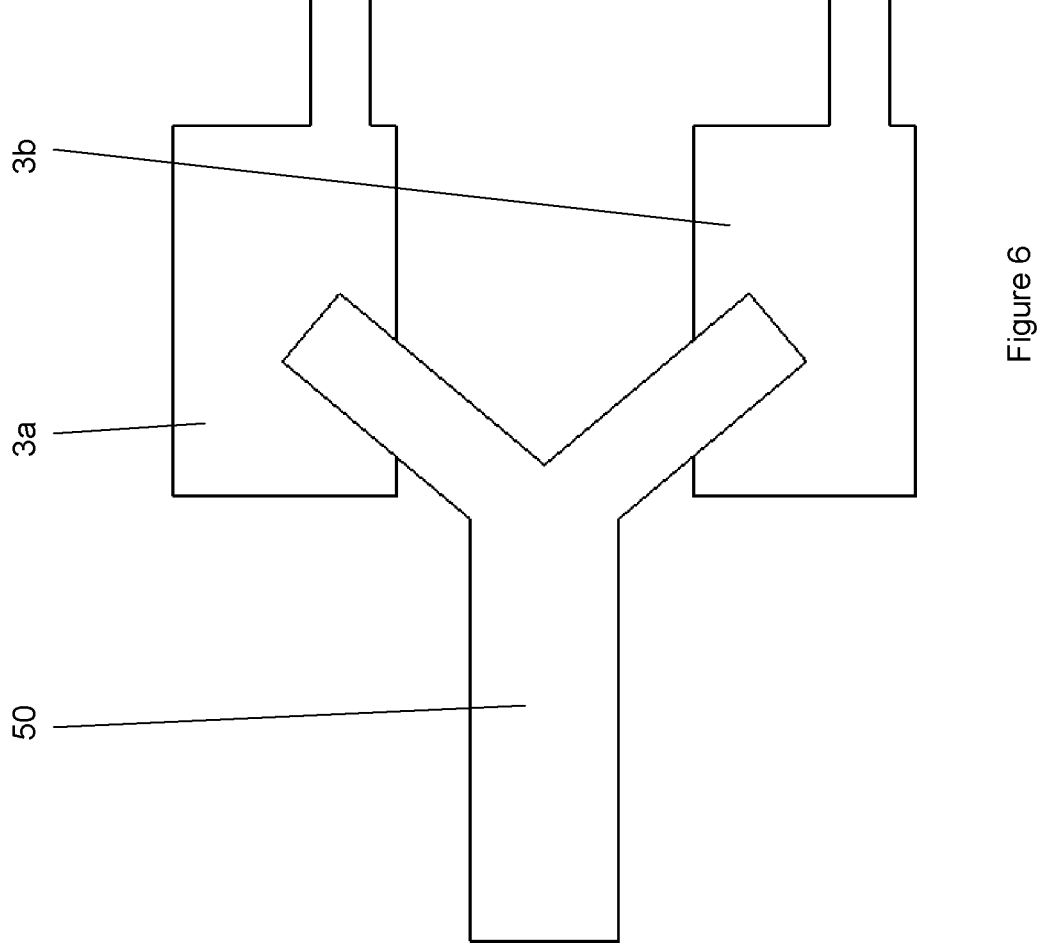
FIG. 6 depicts an embodiment with automated food supply.

In the embodiment of FIG. 2 the supply of mass towards the grinder(s) is done manually by an operator via bin/trolley/loading equipment 40. The same can be done for the supply of for instance skin emulsion or dry ingredients towards mixers 8 via bin/trolley/loading equipment 41. FIG. 6 depicts another embodiment of the invention comprising an automated supply of mass 50 towards the grinder(s) 3 and/or the mixers. Supply can be done by conveyors, loading equipment, AGV's and/or other transportation means. Mass can be supplied for instance directly to the grinder(s) 3 from a (cold) storage or from defrosting equipment which has defrosted frozen food-, preferably meat-blocks. To be able to automate the supply to the grinder means can be provided to check if the grinder(s) needs to be filled and means to check if the grinder(s) is already filled sufficiently, for instance weighing means 6 such as load cells.

Product—Beef

Figure 7:
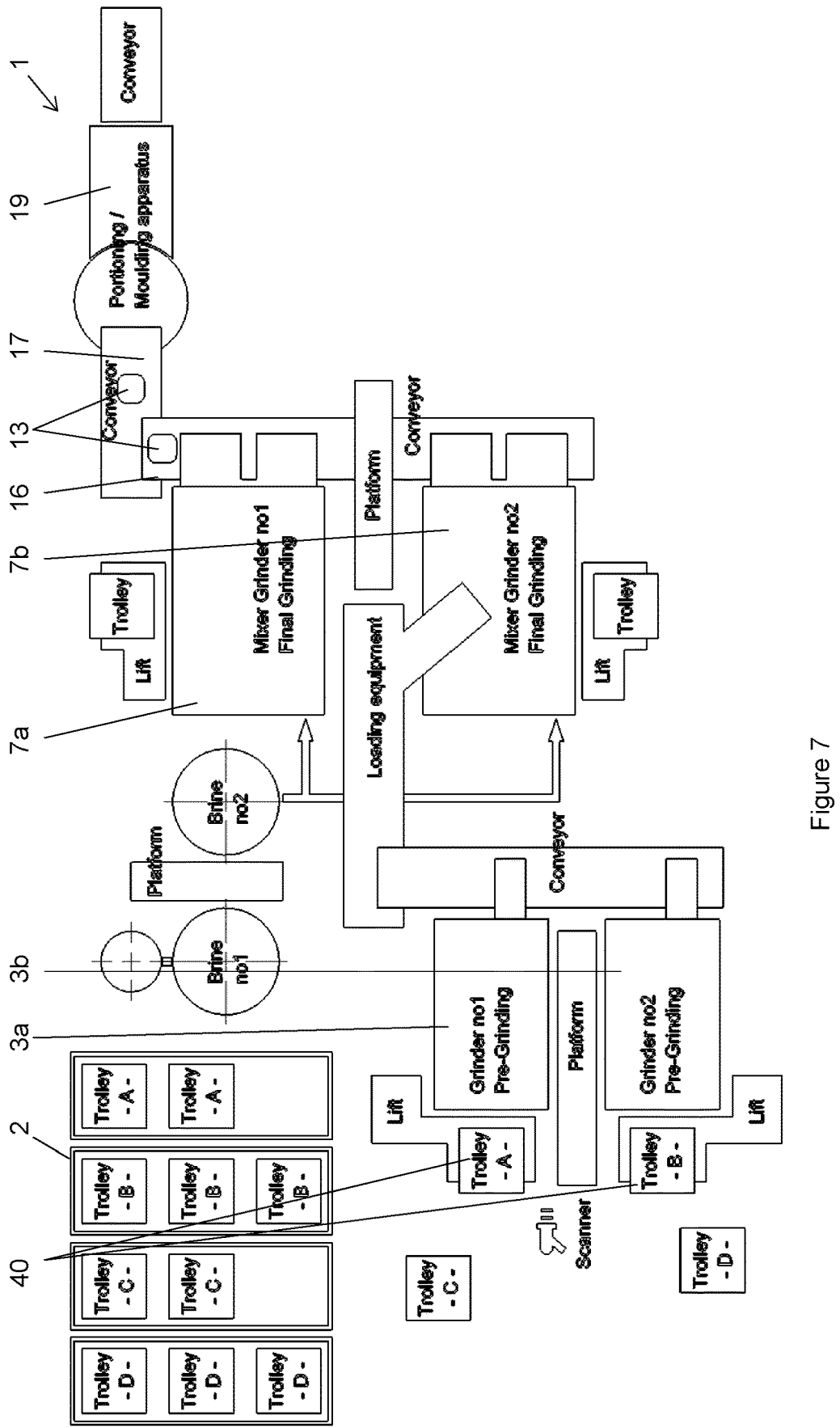
FIGS. 7 and 8 each depict an embodiment specifically for beef as a food substance.

FIG. 7 depicts another embodiment of line 1 which is based on the system depicted in FIG. 2 and in which beef products such as beef patties can be produced. The mass comprises at the pre-grinding location and/or the mixer location at least lean beef meat as well as fatty beef meat and both can be separately supplied to the grinder respectively mixer/mixer-grinder. The mass can be subjected to pre-grinding, mixing and/or final-grinding and will subsequently be portioned/moulded within a portioning/moulding apparatus 19. After portioning/moulding the product can be coated and/or fried and/or cooked and afterwards frozen and/or packaged. In case of processing beef burgers after portioning/moulding the burgers can be fried and thereafter frozen or will be portioned/moulded and thereafter directly frozen. In another embodiment of case-ready products the final grinded products will be portioned/moulded and directly packaged.

Beef—1× Pre-Grinder

The number of grinders 3 to be applied in a first step to pre-grind beef can depend on the desired final mix and the desired flexibility and can vary between one and multiple grinders 3. In order to achieve a desired temperature, the mass can comprise a weight part of fresh meat and a weight part of frozen meat to be pre-ground. Mass can be supplied in bins/trolleys and is stored in (cold) storage 2. Depending on the desired mix trolleys "A" can comprise fresh lean meat (low percentage of fat), trolleys "C" can be filled with frozen lean meat, trolleys "B" can comprise fresh fatty meat and trolleys "D" can be filled with frozen fatty meat. These bins/trolleys will be manually transported towards grinder 3 which is filled with mass via loading equipment 40. In case of applying only one grinder, the content of these four trolleys should be loaded into grinder 3 in the desired ratio fresh/frozen and lean/fatty. This ratio can be determined similar to preparing trolleys with the desired ratio chicken breast meat/chicken leg meat as is described according to FIG. 1.

Beef—2× Pre-Grinder

In a preferred embodiment two grinder(s) 3*a* and 3*b* are applied. First grinder 3*a* can be loaded with trolleys "A" comprising fresh lean meat and will subsequently be loaded with trolleys "C" comprising frozen lean meat. The desired ratio fresh/frozen determines the weight percentage of trolley "A" and trolley "C" to be loaded into grinder 3*a*. The second grinder 3*b* will be loaded with trolleys "B" comprising fresh fatty meat and will subsequently be loaded with trolleys "D" comprising frozen fatty meat, the desired ratio fresh/frozen determines the weight percentage of trolley "B" and trolley "D" to be loaded into grinder 3*b*.

In a second step of the process, discharging of pre-ground lean meat mass out of grinder 3*a* and discharging of pre-ground fatty meat out of grinder 3*b* will take place according the desired weight ratio lean/fatty. The discharged ground mass will be transported from grinder 3*a* and grinder 3*b* to one of the at least two mixer-grinders 7 such as the GEA CombiGrind, depending which mixer-grinder need to be filled. The mass will be mixed within mixer-grinders 7*a/b*. By, for example, adding carbon dioxide or liquid nitrogen the temperature can be further controlled. In case of a request for new mixed mass 13 the mass within mixer-grinder 7 will be final-grinded and supplied to portioning/moulding apparatus 19. Preferably the final-grinder or final mixer-grinder will be provided with a separation set to remove bones and other undesired particles out of the ground mass.

Further downstream the automated system operates similar as described according to FIG. 2. To be able to provide portioning/moulding apparatus 19 with sufficient mixed mass so that it can run continuously at least two mixer-grinders 7 will be applied wherein the at least two mixer-grinders can overlap each other regarding mixing process and discharging from the mixer-grinder such that at least one mixer-grinder 7 will act as a buffer and the discharge time of mixed mass 13 out of the mixer can be extended. Applying two mixer-grinders is beneficial, because food mass 13 does not have to be buffered anymore on conveyors 16/17 and will consequently not be subjected to the ambient surrounding and mixer-grinder(s) 7 are able to control the temperature of the mass during waiting times, i.e. buffering.

Figure 8:
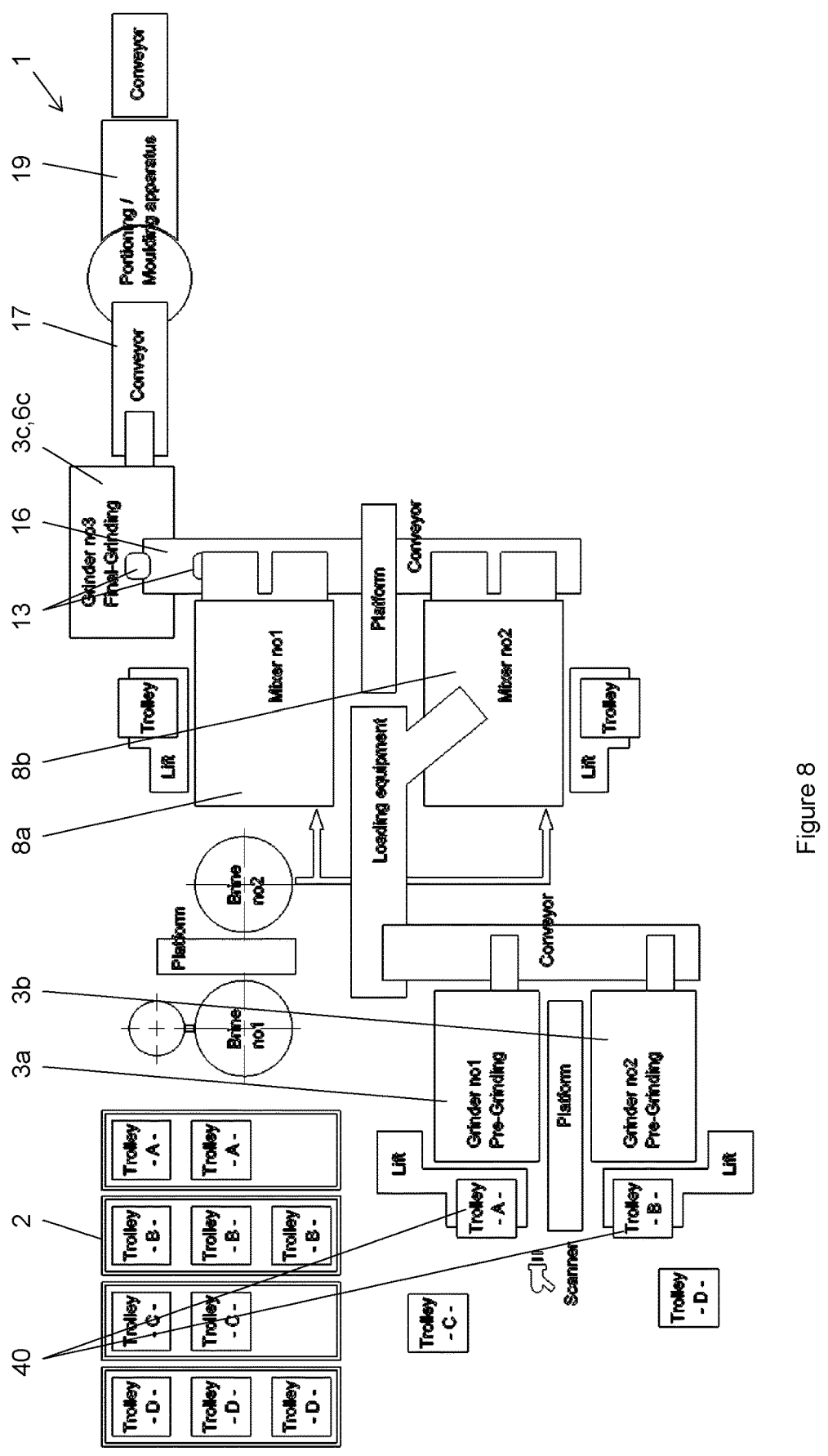

In FIG. 8 another embodiment to produce beef products is depicted. At least one grinder 3 but in a preferred embodiment two grinder(s) 3a and 3b will be applied to pre-grind the beef-mass. Similar as in FIG. 2 the mass will be mixed within at least two mixers 8a/b and at least one of the mixers acts as a buffer and mixed mass 13 can be discharged onto conveyor 16. In this embodiment the mixed mass will be loaded into at least one grinder 3c to be final-ground. This embodiment is advantageous in case a mixer-grinder 7 cannot be applied with vacuum.

In case of a request for new mixed mass 13 the request can be done to grinder 3c but more preferably to mixer 8.

Grinder 3c loaded with mixed mass 13 will supply final-ground mass towards portioning/moulding apparatus 19. In case the capacity of grinder 3c is larger than the capacity of the hopper of portioning/moulding apparatus 19, mixed mass can be supplied entirely from grinder 3c. After a request grinder 3c can be loaded again with mixed mass from mixer 8, in this case grinder 3c will act as a buffer. In case, after a request, the grinder cannot supply sufficient mass to portioning/moulding apparatus 19, mixer 8 which acts at that specific moment as the buffer will supply mass to the grinder and from thereon to portioning/moulding apparatus 19 to compensate this.

While temperature control within the grinder is not possible in a more preferred embodiment grinder 3c will not be loaded entirely full but only to a certain level such that in case of a request mass can be supplied directly to the portioning/moulding apparatus 19 and that subsequently the main volume of mixed mass will be supplied by mixer 8 which acts at that specific moment as the buffer. This mass 13 will be supplied towards portioning/moulding apparatus 19 via conveyor 16 and final-grinder 3c and in this embodiment conveyor 17.

Conveyors 16 and 17 can be provided with weighing means. However, it is more preferred that grinder 3c positioned downstream from mixer(s) 8 will be provided with weighing means 6, preferably load cells, to be able to determine the level of mass within the grinder, to determine weight input "13a/b-w" [kg] of mixed mass 13 and to determine weight output of final-ground mass towards portioning/moulding apparatus 19.

Analyzing fat percentage of mass need to be done in order to end up with the correct fat percentage in portioned/moulded food products. Fat analyzing can be done before the mass will be ground/pre-ground or after grinding. Preferably analyzing of mass will be an inline measurement with, more preferably a Near Infrared analysis NIR system for instance positioned between grinder(s) 3 and mixer 8/mixer-grinder 7. Ground mass will be disposed on conveyor 14/15 such as a conveyor belt or a screw loader and analyzing will take place during transport of ground mass. In another embodiment fat analyzing will take place with an X-Ray system which is more accurate and with the possibility to detect foreign particles such as bone and metal.

Assume grinder 3a is loaded with lean beef meat and grinder 3b with fatty beef meat. In case that measurement shows that fat percentage of ground mass discharged from grinder 3a and supplied to mixer 8 is not according the desired percentage a correction should be done. More or less fatty mass should be discharged from grinder 3b and consequently measured and supplied to mixer 8. In case measurements show that the final mixed mass will not consist of the correct fat percentage further lean and/or fatty mass should be pre-grind and supplied to mixer 8. Preferably the correction is automated.

In case of producing beef products portioning/moulding apparatus 19 can be provided with a grinding head in order to produce hand-made looking products.

Figure 9:
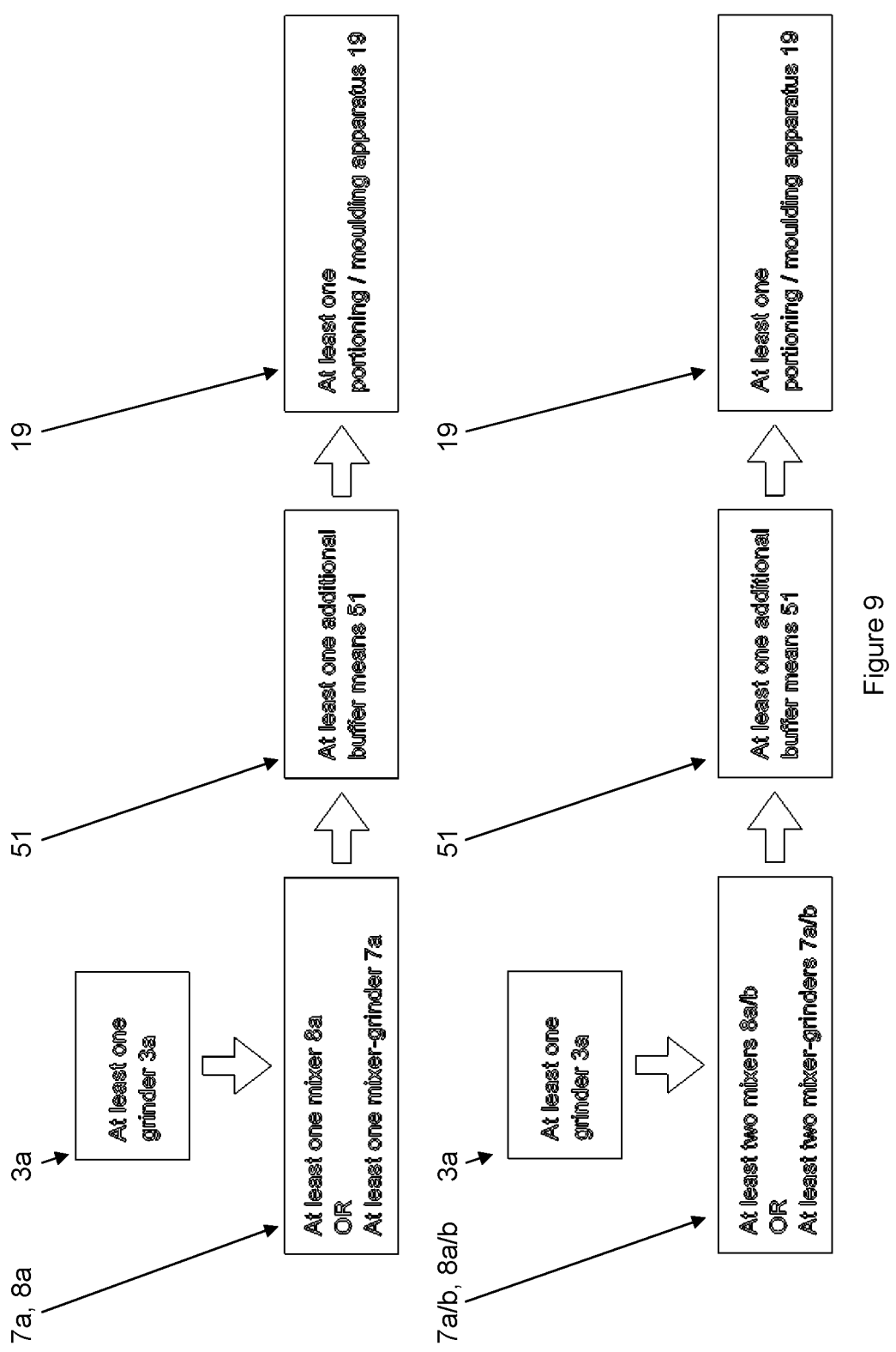
FIG. 9 depicts an embodiment of the present invention with an additional buffer.

In a further embodiment depicted in FIG. 9 of the invention the automated food/feed mass transport line/system 1 comprising at least one grinder 3 which grinds or pre-grinds food to form a food mass 5, at least two mixers 8a, 8b which mixes the ground or pre-ground food mass 5 or at least two mixer-grinders 7a,7b which further mixes and grinds the ground or pre-ground food mass 13 wherein at least one of the mixers/mixer-grinders act as a buffer, at least one additional buffer means 51 and at least one portioning/moulding apparatus 19 to portion and/or mould individual food/feed products, wherein the grinder 3, mixers 8 or mixer-grinders 7, buffer means 51 and portioning/moulding apparatus 19 are preferably connected by conveyors 14,15,16,17 and/or wherein buffer means 51 are located between the mixers 8/mixer-grinders 7 and portioning/moulding apparatus 19. The additional buffer means 51 are preferably located after the at least two mixer-grinders 7a, 7b/mixers 8a,8b and before the at least one portioning moulding apparatus 19

Buffer means 51 is in the context of this application not limited to for instance a hopper or bin but can be a wide variety of devices or equipment such as a pump, a screw, a belt, a mixer. In case the capacity of buffer 51 is larger than the capacity of the hopper of portioning/moulding apparatus 19, mixed mass can be supplied entirely from buffer 51. After a request of food mass 5, buffer 51 can be loaded again with food mass from mixer 8/mixer-grinder 7. In case, after a request of food mass 5, the buffer cannot supply sufficient mass to portioning/moulding apparatus 19, mixer 8/mixer-grinder 7 which acts at that specific moment as the buffer will supply mass to buffer 51 and from thereon to portioning/moulding apparatus 19 to compensate this.

In an alternative embodiment of the invention the automated food/feed mass transport line/system 1 comprising at least one grinder 3 which grinds or pre-grinds food to form a food mass 5, at least one mixer 8 which mixes the ground or pre-ground food mass 5 or at least one mixer-grinders 7a,7b which further mixes and grinds the ground or pre-ground food mass 13, at least one additional buffer means 51 and at least one portioning/moulding apparatus 19 to portion and/or mould individual food/feed products, wherein the grinder 3, mixer 8 or mixer-grinder 7, buffer means 51 and portioning/moulding apparatus 19 are preferably connected by conveyors 14,15,16,17 and wherein buffer means 51 are located between the mixer 8/mixer-grinder 7 and portioning/moulding apparatus 19.

Disclaimer

A combination of in FIGS. 2-9 described systems and control systems are also applicable.

The described application of multiple grinders to be able to process chicken breast meat/chicken leg meat and to process lean beef meat/fatty beef meat is also applicable for other combinations of two or more grinders processing two or more different masses.

LIST OF REFERENCE SIGNS

1 food processing line/system
2 storage area, cold storage area
3 grinder
4 screw grinder
5 ground mass discharged from grinder 3
6 weighing means e.g. load cell(s) grinder 3
7 mixer-grinder
8 mixer

9 paddles mixer 8/paddles mixer-grinder 7

10 weighing means e.g. load cell(s) mixer 8/mixer-grinder 7

11 discharge opening mixer 8/mixer-grinder 7

12 open/closing means discharge opening mixer 8/mixer-grinder 7

13 mass/product discharged from mixer 8/mixer-grinder 7

14 conveyor/weighing means, conveyor/weighting belt connecting discharge openings grinder(s) 3

15 conveyor/weighing belt/loader between grinder 3 and mixer 8/mixer-grinder 7

16 conveyor/weighing belt connecting discharge openings mixer 8/mixer-grinder 7

17 conveyor/weighing belt towards hopper portioning/moulding apparatus 19

18 conveyor after portioning/moulding apparatus 19

19 portioning/moulding apparatus

20 measuring/detecting means e.g. low level/and high level, pressure sensing means

21 measuring/detecting means e.g. high level, pressure sensing means

25*a* mixer/mixing tank for ingredients

25*b* buffer/buffer tank for mixed ingredients

26 ingredient supply line to mixer 8/mixer-grinder 7

30 control unit

31 parameter input source e.g. operating panel

32 reading means, scanning means, trolley scanner

40 bin, trolley, loading equipment at grinder 3 location

41 bin, trolley, loading equipment at mixer 8/mixer-grinder 7 location

42 bin, trolleys at discharge opening mixer 8

43 bin, trolley, loading equipment at portioning/moulding apparatus 19 location

50 automated supply mass towards grinder 3

51 buffer means

"4-drive" drive/rotational speed/direction screw 4 of grinder 3

"5-*w*" weight discharged ground mass mixer 3*a*/3*b* [kg]

"9-drive" drive/rotational speed/direction/torque control paddle mixer 7/8

"11-openness" openness discharge opening(s) 11 mixer 8*a*/*b* [%]

"13-*w*" weight discharged mass out of mixer-grinder 7 or grinder 8 [kg]

"14-drive" drive conveyor 14

"15-drive" drive conveyor 15

"15-mixer selection" drive to select in mixer wherein discharging ground mass "16-drive" drive/belt speed conveyor 16

"17-drive" drive/belt speed conveyor 17

"16/17-empty" time wherein conveyors 16/17 will be emptied [s]

"18-drive" drive conveyor 18

"19-distance 8*a*″″" distance discharge mixer 8*a* to hopper 19 [m]

"19-distance 8*b*″″" distance discharge mixer 8*b* to hopper 19 [m]

"26-V" discharged ingredients out of buffer/buffer tank 25*b* [liter]

"41-*w*" discharged ingredients out of bin/trolleys 41 [kg]

The invention claimed is:

1. A food processing line comprising:

at least one grinder which grinds or pre-grinds food to form a food mass;

at least two mixers which mix the round food mass, or at least two mixer-grinders which further mixes and grinds the d-food mass; and at least one portioning/moulding apparatus to portion and/or mould individual food/feed products from the food mass, wherein the at least one grinder, the at least two mixers, and the at least one portioning/moulding apparatus are connected by conveyors, wherein each of the at least two mixers or each the at least two mixer-grinders operate as a buffer, wherein a moving device of each of the at least two mixers that mixes the food mass or a moving device of the at least two mixer-grinders that further mixes and grinds the food mass, is driven by a torque-controlled motor, wherein torque that the torque-controlled motor provides depends on a temperature of the food mass in the at least two mixers or the at least two mixer-grinders, wherein the torque is controlled to obtain a consistent discharged mixed mass from different batches with regard to a level of ice crystallization and/or temperature, wherein at least one of the at least two mixers or the at least two mixer-grinders is/are applied as the buffer instead of a conveyor to maintain the level of ice crystallization and/or temperature and/or to maintain the temperature of the food mass during waiting times, wherein the food processing line comprises a control system comprising data about the torque needed to mix a specific mass in the at least two mixers or the at least two mixer-grinders which has a certain desired degree of ice crystallization.

2. The food processing line according to claim 1, wherein the at least one portioning/moulding apparatus operates continuously and filling of a hopper occurs semi-continuously.

3. The food processing line according to claim 1, wherein each of the at least two mixers or each of the at least two mixer-grinders are provided with a controlled opening/closing means.

4. The food processing line according to claim 1, wherein each of the at least two mixers or each of the at least two mixer-grinders have means to adjust or maintain the temperature of the food mass.

5. The food processing line according to claim 1, wherein the conveyor transports the food mass from the at least two mixers or from the at least two mixer-grinders to the at least one portioning/moulding apparatus.

6. The food processing line according to claim 1, wherein the at least one grinder and/or the at least two mixers and/or the at least two mixer-grinders is provided with a weighting device or load cell.

7. The food processing line according to claim 1, wherein a hopper is provided upstream from the at least one portioning/moulding apparatus.

8. The food processing line according to claim 1, wherein a trolley scanner is provided upstream from the at least one grinder.

9. A food processing line comprising:

a grinder configured to grind or pre-grind food to form a food mass;

two mixers that are configured mix the food mass, or two mixer-grinders that are configured to mix and grind the food mass; and a portioning/moulding apparatus configured to portion and/or mould individual food/feed products from the food mass, wherein each of the two mixers or each of the two mixer-grinders operate as a buffer, wherein a moving device of each of the two mixers that are configured to mix the food mass, or a moving device of each of the two mixer-grinders that are configured to mix and grind the food mass, is driven by a torque-controlled motor, and torque that the torque-controlled motor provides depends on a temperature of the food mass in the two mixers or the two mixer-grinders, wherein the torque is controlled to obtain a consistent discharged mixed mass from different batches with regard to a level of ice crystallization and/or temperature, wherein at least one of the two mixers or at least one of the two mixer-grinders is/are applied as the buffer to maintain the level of ice crystallization and/or temperature and/or to maintain the temperature of the food mass during waiting times, and wherein the food processing line comprises a control system comprising data about the torque needed to mix a specific mass in the two mixers or the two mixer-grinders.

10. The food processing line according to claim 9, wherein the portioning/moulding apparatus operates continuously and filling of a hopper occurs semi-continuously.

11. The food processing line according to claim 10, wherein each of the two mixers or each of the two mixer-grinders are provided with a controlled opening/closing means.

12. The food processing line according to claim 11, wherein each of the two mixers or each of the two mixer-grinders have means to adjust or maintain the temperature of the food mass.

13. The food processing line according to claim 12, wherein a conveyor transports the food mass from the two mixers or from the two mixer-grinders to the portioning/moulding apparatus.

14. The food processing line according to claim 13, wherein the grinder and/or the two mixers and/or the two mixer-grinders is/are provided with a weighting device or load cell.

15. The food processing line according to claim 14, wherein a trolley scanner is provided upstream from the grinder.

\* \* \* \* \*